US010471635B2

(12) United States Patent
Oeschger et al.

(10) Patent No.: US 10,471,635 B2
(45) Date of Patent: Nov. 12, 2019

(54) METHOD FOR MANUFACTURING A COMPOSITE PART AND USE THEREOF

(71) Applicant: Brugg Rohr AG Holding, Brugg (CH)

(72) Inventors: Alfred Oeschger, Wil (CH); Juergen Kress, Oberwil-Lieli (CH); Christian Dambowy, Gebenstrof (CH)

(73) Assignee: Brugg Rohr AG Holding, Brugg (CH)

( * ) Notice: Subject to any disclaimer, the term of this patent is extended or adjusted under 35 U.S.C. 154(b) by 309 days.

(21) Appl. No.: 15/505,645

(22) PCT Filed: Aug. 5, 2015

(86) PCT No.: PCT/CH2015/000114
§ 371 (c)(1),
(2) Date: Feb. 22, 2017

(87) PCT Pub. No.: WO2016/033700
PCT Pub. Date: Mar. 10, 2016

(65) Prior Publication Data
US 2017/0246774 A1   Aug. 31, 2017

(30) Foreign Application Priority Data

Sep. 4, 2014  (CH) ...................... 1345/14

(51) Int. Cl.
| | |
|---|---|
| *B29C 44/12* | (2006.01) |
| *B29C 39/10* | (2006.01) |
| *B29C 41/22* | (2006.01) |
| *B29C 39/12* | (2006.01) |
| *B29C 39/36* | (2006.01) |
| *B29C 41/08* | (2006.01) |
| *B29C 44/06* | (2006.01) |
| *B29C 44/32* | (2006.01) |
| *B29C 44/14* | (2006.01) |
| *F16L 59/18* | (2006.01) |
| *B29L 23/00* | (2006.01) |
| *B29K 623/00* | (2006.01) |
| *B29K 675/00* | (2006.01) |
| *B29K 75/00* | (2006.01) |

(52) U.S. Cl.
CPC .......... *B29C 44/1228* (2013.01); *B29C 39/10* (2013.01); *B29C 39/12* (2013.01); *B29C 39/123* (2013.01); *B29C 39/36* (2013.01); *B29C 41/08* (2013.01); *B29C 41/22* (2013.01); *B29C 44/06* (2013.01); *B29C 44/12* (2013.01); *B29C 44/1214* (2013.01); *B29C 44/1242* (2013.01); *B29C 44/1266* (2013.01); *B29C 44/1295* (2013.01); *B29C 44/14* (2013.01); *B29C 44/32* (2013.01); *F16L 59/18* (2013.01); *B29K 2075/00* (2013.01); *B29K 2623/06* (2013.01); *B29K 2675/00* (2013.01); *B29K 2995/0015* (2013.01); *B29L 2023/225* (2013.01)

(58) Field of Classification Search
CPC ....... B29C 39/10; B29C 39/12; B29C 39/123; B29C 39/36; B29C 41/08; B29C 41/22; B29C 44/00; B29C 44/06; B29C 44/12; B29C 44/1214; B29C 44/1266; B29C 44/1295; B29C 44/32
USPC ........ 264/41, 45.1, 45.2, 241; 427/133, 135; 135/145, 146, 149
See application file for complete search history.

(56) References Cited

U.S. PATENT DOCUMENTS

| | | | |
|---|---|---|---|
| 5,223,193 A | 6/1993 | Bianchin et al. | |
| 5,580,501 A | 12/1996 | Gallagher et al. | |
| 6,764,621 B2 | 7/2004 | Schwaighofer | |
| 2005/0244628 A1 | 11/2005 | Turek et al. | |
| 2013/0098493 A1 | 4/2013 | Ellersiek | |

FOREIGN PATENT DOCUMENTS

| | | | | |
|---|---|---|---|---|
| CA | 2 852 841 A1 | 4/2013 | | |
| CA | 2852841 A1 | * | 4/2013 | ......... B29C 44/1242 |
| DE | 101 53 855 A1 | 7/2002 | | |
| DE | 10 2007 061 643 A1 | 6/2009 | | |
| EP | 1190828 A1 | 3/2002 | | |
| WO | 2005/058573 A1 | 6/2005 | | |
| WO | 2013/057227 A1 | 4/2013 | | |

OTHER PUBLICATIONS

International Search Report of PCT/CH2015/000114, dated Oct. 13, 2015.
Din En 12667, Thermal performance of building materials and products—Determination of thermal resistance by means of guarded hotplate and heat flow meter methods, Products of high and medium thermal resistance, May 2001, 55 pages.
ISO 844, Rigid cellular plastics—Determination of compression properties, Sixth edition, Aug. 1, 2014, 16 pages.

* cited by examiner

*Primary Examiner* — William P Fletcher, III
(74) *Attorney, Agent, or Firm* — Collard & Roe, P.C.

(57) ABSTRACT

For manufacturing composite parts (1) having an inner hollow moulded body (2) with openings (3), which are accessible from outside, the moulded body is introduced into a moulding tool on the mould walls on which a shell layer (11) was applied. The hollow space between the moulded body (2) and the shell layer (11) is filled with a thermally insulating plastic foam (12) which is foamed in the moulding tool and bonds to the moulded body and the shell layer. After removal, a moulded body is provided, which has a qualitatively good surface formed by the shell layer. Such a composite part is preferably used for connecting thermally insulating pipes.

14 Claims, 1 Drawing Sheet

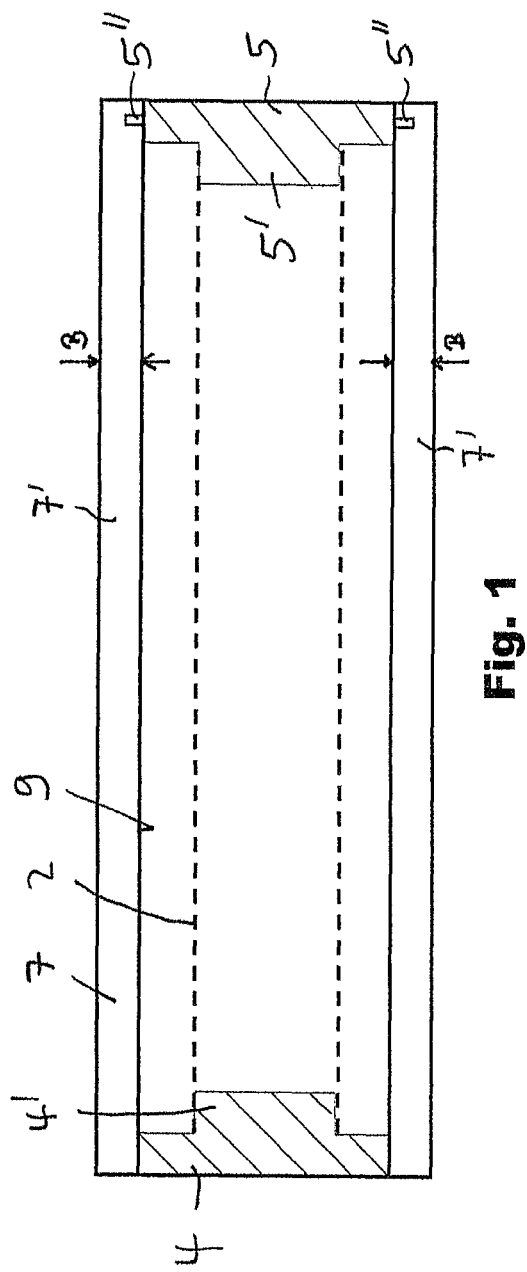
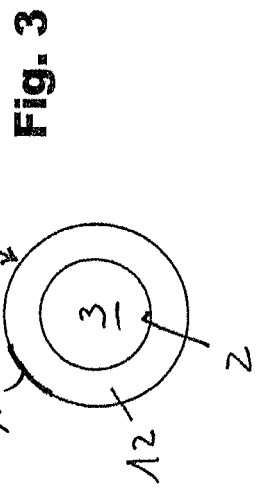
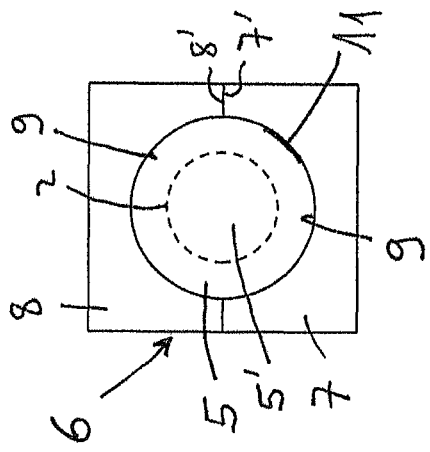
Fig. 1
Fig. 2
Fig. 3

METHOD FOR MANUFACTURING A COMPOSITE PART AND USE THEREOF

CROSS REFERENCE TO RELATED APPLICATIONS

This application is the National Stage of PCT/CH2015/000114 filed on Aug. 5, 2015, which claims priority under 35 U.S.C. § 119 of Switzerland Application No. 1345/14 filed on Sep. 4, 2014, the disclosure of which is incorporated by reference. The international application under PCT article 21(2) was not published in English.

FIELD OF THE INVENTION

The invention relates to a method for manufacturing a composite part having at least an inner hollow moulded body with openings, the openings being accessible at the composite part. Furthermore, the invention relates to a use of a composite part manufactured according to the method.

BACKGROUND

Fittings are used for connecting thermally insulated pipes, as they are e.g. used for transporting cooled media like water. These fittings consist of an inner part through which the medium flows, mostly a hollow body made of polyethylene (PE). This hollow body is surrounded on the outside entirely by a thermally insulating material, mostly polyurethane (PU), except for its openings for the medium. These fittings are consequently thermally insulated in order to avoid that environment air heats up the cooled medium. No condensed water shall be able to form on the surface of the fitting and the surface must additionally be mechanically robust in order to withstand the stress during mounting, for the reason which often a shell made of PE is used, which is located on the thermal insulation. The fittings may have different shapes. Accordingly, straight connections exist, but also curved shapes or T-pieces are needed. In many cases, these fittings have additional channels leading to the outside, which have to remain open on the top side. These channels serve as contacts for cables connected during mounting and in this way enable an electrical welding of the fitting ends to the pipe ends.

Manufacture of such composite parts can be carried out by introducing the inner part into the PE-shell and by surrounding it with foam with a suitable material after having centered it in the middle. Thereby it is problematic that curved or branched inner parts cannot be processed in this way, because positioning inside the prefabricated PE-shell cannot be achieved. Hence, this method is only universally usable for straight pieces not having contacts for electrical welding. A further disadvantage is the necessity to have to provide the PE-shell. These parts have to be injection-moulded in a complex way. Furthermore, the wall thickness of the PE-shell is relatively large, resulting in a high material cost.

DE 10153855 A1 describes a method by means of which a moulded body is backfilled only partially at a defined location, after the surface of the mould was provided with a decorative coating at this location, which later forms the surface of the finished part. This function of this surface in primarily decorative, a special mechanical robustness is not mentioned. The used foam has no thermally insulating function.

Instead of a finish, which is sprayed into the mould, a mould skin may also be introduced, which then forms the surface of the finished composite part. This is e.g. described in DE 102007061643 A1. The necessity of having to manufacture the mould skin in a separate work step is a disadvantage of this method. Besides, a one-component PU-system is used, which has to be tempered in order to harden.

EP 1190828 A1 describes a similar method but with the difference that the mould is constructed of multiple parts, thus simplifying the removal of more complex composite parts with undercuts.

U.S. Pat. No. 5,223,193 A claims a method in case of which a reactive isocyanate/polyol-mixture is applied on the mould. Subsequently, the mould rotates in order to achieve a uniform distribution on the surface and thereafter the foaming is performed with a second PU-system. In this method, no inner part is surrounded by foam.

U.S. Pat. No. 5,580,501 A describes how a first layer of PU-based powder finish is applied in a mould. This method also requires tempering in order to melt the powder finish and to make it react. Inner parts surrounded with foam are not provided.

US 2005244628 A describes how a soft object can be manufactured by also first applying a coating in a mould and subsequently applying a second coating with a different polymer. Hard foam is not used here.

DESCRIPTION OF THE INVENTION

It is the object of the invention to provide an efficient manufacturing method for composite parts, consisting of a prefabricated plastic moulded body through which a temperature-controlled liquid medium is guided in the finished composite part, a thermal insulation layer surrounding this mould body, with a surface layer arranged on it, which is robust against mechanical stress. This surface layer shall form a surface of the composite material giving a quality impression.

This object is achieved by the features described herein.

The advantages of the claimed method are manifold. A complex composite part of plastic is manufactured in a few method steps, which is only hard to manufacture or not at all with alternative methods. A higher throughput is possible due to the few method steps and consequently a high productivity is ensured. Besides, the production step for the PE outer shell is obsolete, not being necessary anymore. This also results in a substantial material saving, because the shell layer is in each case only applied with the thickness that is actually required for end use. The preferred thickness of 0.1 mm to 3 mm is considerably smaller than the thickness of the normally used PE outer shell, which is between 3 mm and 6 mm. The properties of the surface of the composite part may be determined by the choice of the material of the shell layer applied in the tool, as well as the bond between the shell layer and the thermally insulating foam. The final properties of the composite can be adjusted in a targeted way depending on each case by the stepwise process. For example, the surface may be changed with respect to hardness by the choice of the shell layer. According to this, each part of the composite has a very special function; the inner part serves to transport the temperature-controlled medium, the insulating foam has good properties with respect to heat insulation and is relatively hard in order to provide a good overall stability, the outer skin exhibits an elastic behaviour and is not sensitive to scratches or other mechanical influences.

As mentioned, the shell layer is preferably applied with a thickness ranging from 0.1 mm to 3 mm. The thickness may be chosen depending on use of the composite part, such that it satisfies the requirements for the respective use. The thickness can particularly be chosen lower than 3 mm. Particularly, the shell layer is applied in tool parts by spraying of a plastic, thus allowing a fast and targeted application with the desired thickness. Preferably, the shell layer is formed based on polyurethane. This results in the desired bonding between the shell layer and the thermal insulation, which is preferably a PU-foam. The shell layer can be applied during application inside the tool in one layer or multiple layers.

The introduction of the at least one plastic foam component into the moulding tool is done preferably before closing the moulding tool, such that e.g. two components for forming the PU-foam are filled into the open lower tool part, after the moulded body has been positioned in the moulding tool. Thereafter, the upper tool is placed on top and the tool parts are fixed. Foaming and bonding of the foam with the shell layer and the moulded body takes place. Alternatively, the tool is first closed and the introduction of the foaming substances via at least one opening provided for this purpose in the tool is carried out.

Preferably, the at least one shell layer is formed, or the plastic material for the shell layer is chosen, respectively, in such a way that the shell layer has a hardness of at least 40 Shore-D as surface of the composite part. It is further possible to apply a further shell layer on the removed composite part or to apply multiple layers, as the case may be, if this is desired for achieving special surface properties of the composite part. The thermally insulating plastic foam preferably has a thermal conductivity smaller than 0.040 W/m*K measured at 50° C. according to the standard EN12667, as well as particularly a pressure strength of at least 100 kPa, determined according to the standard ISO 844.

Preferably, the thermally insulating plastic foam is formed by an isocyanate/polyol-mixture, which is formed for chemically reacting at room temperature. Preferably, opening of the tool parts and removal of the composite part is done when the hardening is in a sufficiently advanced state, particularly meaning that the conversion of the components of the insulating plastic foam in the moulding tool has completed to at least 80% to 95%. It is further preferred that the contact surfaces of the tool parts are narrow, such that the tool parts only touch one another on a width of 0.5 millimeters to 1 millimeter. This results in a quality of the shell layer in the area of the contact surfaces, which makes deburring after removal obsolete.

The moulded body surrounded by foam may have any arbitrary shape, curved parts or T-pieces may also be processed successfully. It is also readily possible to use moulded bodies having bridges, channels or any other appendage at arbitrary positions.

The preferred use of the composite part manufactured by the method is the use as fitting for connecting thermally insulated pipes having an inner pipe, a thermal insulation surrounding it and an outer shell. The use is performed in known ways by introducing the inner pipes of the pipe, which are cleared in the connection area, into the openings of the composite part or the fitting, respectively, and attaching them there in suitable ways.

BRIEF DESCRIPTION OF THE DRAWINGS

Further embodiments, advantages and applications of the devices and the methods will be apparent from the dependent claims and the following description of exemplary embodiments based on the figures. It is shown in FIG. 1 a top view on the one tool part of the moulding tool;
FIG. 2 a front view of the closed moulding tool;
FIG. 3 a front view of a composite part.

WAY(S) OF IMPLEMENTING THE INVENTION

An embodiment is described by means of FIGS. 1 to 3 as example for the invention. In order to simplify the drawing, the moulded body has been chosen as cylindrical moulded body without branches. As mentioned, the method according to the invention allows the manufacture of composite parts with more complex shapes of the inner moulded part.

FIG. 1 shows a top view on the first tool part 7 of a two-part moulding tool 6. Both tool parts 7 and 8 are visible in closed state in FIG. 2. FIG. 1 shows the top view on the tool part 7, the mould wall 9 of which has a shape of a round half-cylinder in this example. A cylindrical shape results with the upper or the second tool part 8, respectively, such that the removed composite part is cylindrical on its outside, as can be seen in the front view of the composite part 1 in FIG. 3. FIG. 1 shows furthermore closing parts 4 and 5 of the moulding tool in section view. In this example, the closing parts 4 and 5 serve at the same time for positioning the moulded body 2, which is shown in FIG. 1 only with interrupted lines. Furthermore, the closing parts 4 and 5 also take over the function of closing the front openings 3 of the moulded body 2 during the method or during the foaming, respectively. For this purpose, the closing parts 4 and 5 have plugs 4' and 5', which are dimensioned in such a way that they protrude through the openings 3 of the moulded body 2 into its interior and abut against the inner wall of the moulded body, such that they close the openings 3 in a foam-tight way. If the moulded body 2 has a more complex shape with multiple openings, separate means or plugs, respectively, may accordingly be provided to close these openings. Equally, further means for positioning the moulded body 2, which are separate from the closure of the moulding tool, may be provided inside the moulding tool. In addition, the moulding tool may be formed by more than two tool parts. The closing parts 4 and 5 may be attached to the tool parts in arbitrary known ways. In FIG. 1 it is indicated for the closing part 5 that it is attachable to the tool part by a flange 5", which engages a corresponding groove in the tool part.

The shell layer 11 is applied onto the mould wall 9 of the tool parts before positioning the moulded body 2 and the closing parts 4, 5, wherein this is particularly applied to the entire mould wall, such that it is entirely covered by the shell layer 11. For a better illustration, the shell layer is partially emphasized with respect to the drawing with a thicker line in FIG. 2 and FIG. 3, wherein the shell layer 11 is located in FIG. 2 behind the closing part 5 in the interior of the moulding tool and is actually not visible. The shell layer is preferably applied by spraying it onto the inner wall 9 of each tool part 7 and 8. Furthermore, the shell layer is preferably a PU-based plastic. The thickness of the applied shell layer depends on the usage of the finished composite material and the property profile of the plastic used for forming the shell layer. A thickness between 0.1 mm and 3 mm is preferred. The applied layer should be as much as possible compatible with the foam used subsequently. The reason for this is that in this way a good adherence between both components is achieved. Due to the preferred usage of a PU-based hard foam material for the thermally insulating plastic foam, a PU-system is also advantageous for the shell layer. The mechanical endurance of the surface is a crucial criterion for the use of the finished composite part. The hardness of the shell layer must have a minimum value of preferably 40 Shore-D. The stability against other environment influences like chemical substances or UV-radiation may also be adjusted.

The shell layer may be aired for a predefined time after the application on the mould wall 9, or one may wait for a reaction time for the shell layer. As the case may be, a separating layer may be applied onto the mould wall 9, before application of the shell layer 11 onto the mould wall 9, thereby simplifying later removal.

After applying the shell layer on the mould walls 9 of the tool parts 7, 8, the moulded body 2 is positioned inside the tool part 7. This may be carried out in the described way with the closing parts 4 and 5 or with other means. If other means are used for positioning, closing the openings is also performed with other means, particularly with separate plugs. The moulded body 2 is preferably positioned in the middle of the moulding tool 6, such that the thickness of the insulating foam layer is uniform for the finished composite part. Subsequently, the material forming the foam is introduced into the moulding tool. This may be carried out with an opened moulding tool by filling into the lower moulding tool part, whereafter the upper moulding tool part is superimposed and the moulding tool parts are fixed in order to form a closed moulding tool during foaming and hardening.

Preferably, the moulding tool is formed in such a way that the respective contact surfaces 7' and 8' of both tool parts 7 and 8 have each a width B ranging from 0.5 millimeters to 1 millimeter, as indicated in FIG. 1 for the contact surfaces 7', such that the two tool parts only touch one another along a correspondingly narrow contact surface. It has been noticed that this embodiment is advantageous for the composition of the surface of the composite body in the area where the tool parts touch one another, or that in this way virtually no ridge is created on the composite body at the position where the tool parts touch one another.

The foaming material, which forms the thermally insulating plastic foam, is preferably a two-component system, consisting of a isocyanate component and a polyol component reacting immediately after filling into the moulding tool and forming a foam which then surrounds the inner moulded body, except for its openings which are kept clear. In order for the foam to have sufficient insulating properties, it is preferably closed-cell and has a heat conductivity smaller than 0.040 W/m*K measured at 50° C. and according to the standard EN12667.

The plastic foam bonds to the shell layer during foaming and particularly preferably also to the moulded body. As explained before, substances compatible with it are used for the shell layer and the thermally insulating foam and preferably this is a PU-based shell layer and a PU-based hard foam. After sufficient hardening of the foam layer, the moulding tool is opened and the finished composite part in removed. Sufficient hardening is understood particularly in the sense that the conversion of the components of the insulating plastic foam in the moulding tool has completed to at least 80% to 95%.

A mechanical post-processing may be carried out, e.g. deburring. It is furthermore possible to apply another layer onto the shell layer in order to continue changing the surface of the composite part.

The moulded body surrounded by foam may have any arbitrary shape, curved parts or T-pieces may also be processed successfully. It is also readily possible to use moulded bodies having bridges, channels or any other appendage at arbitrary positions.

FIG. 3 shows a front view of a composite part, manufactured according to the method, with the inner mould part 2 with the opening 3 or, in this example, with the openings 3 arranged in the longitudinal axis of the cylindrical moulded body 2. This moulded body 2 is surrounded by thermally insulating plastic foam 12. The shell layer 11, which confers the desired surface properties to the surface of the composite part 1, is arranged outside at the foaming body. Preferably, the composite part 1 manufactured in this way is a fitting or a similar part provided for connecting thermally insulated pipes. Such pipes have an inner pipe guiding the cooled or heated medium, a thermal insulation surrounding the inner pipe, particularly a PU hard foam insulation, and an outer shell. When the composite part 1 is used for connecting such pipes, the outer shell and the thermal insulation is removed in the area of the connection and the cleared inner pipe is introduced into the composite part 1 or the fitting, respectively, and is attached there in a fluid-tight way by known methods.

While preferred embodiments of the invention are described in the present application, it is clearly noted that the invention is not limited thereto and may be executed in other ways within the scope of the following claims.

The invention claimed is:

1. Method for manufacturing a composite part (1) having at least an inner hollow moulded body (2) with openings (3), comprising the steps of
   providing a moulding tool (6) which can be closed and opened, with at least a first tool part (7) and a second tool part (8), wherein the moulding tool defines in closed state, with its inner mould walls, the size and the contour of the finished composite part (1);
   applying at least a shell layer (11) made of plastic onto the inner mould walls (9) of both tool parts (7, 8);
   positioning the moulded body (2) in the moulding tool (6) in such a way that the moulded body comes to lie inside the moulding tool when the moulding tool is closed and that the openings of the moulded body are closed;
   surrounding the moulded body inside the closed moulding tool with a thermally insulating plastic foam (12), which is introduced into the moulding body in one component or multiple components and expands therein and bonds with the shell layer and the moulded body; and
   opening the moulding tool and removing the composite part formed by the moulded body (2), a thermally insulating plastic foam (12) and the shell layer (11).

2. Method according to claim 1, wherein the moulding tool is opened when the conversion of the components of the insulating plastic foam in the moulding tool has completed to at least 80% to 95%.

3. Method according to claim 1, wherein the shell layer is applied with a thickness of 0.1 mm to 3 mm, particularly by spraying a plastic forming the shell layer.

4. Method according to claim 1, wherein the shell layer is formed based on polyurethane.

5. Method according to claim 1, wherein the shell layer is applied in one layer or in multiple layers.

6. Method according to claim 1, wherein the introduction of the at least one plastic foam component into the moulding tool is done before closing the moulding tool.

7. Method according to claim 1, wherein the introduction of the at least one plastic foam component into the moulding tool is done after closing the moulding tool.

8. Method according to claim 1, wherein the common contact surfaces (7' or 8', respectively) of both tool parts (7 and 8) have each a width ranging from 0.5 millimeters to 1 millimeter.

9. Method according to claim 1, wherein the at least one shell layer is formed in such a way that it has a hardness of at least 40 Shore-D as surface of the composite part.

10. Method according to claim 1, wherein at least a further shell layer is applied on the removed composite part (1).

11. Method according to claim 1, wherein the thermally insulating plastic foam is closed-cell.

12. Method according to claim 1, wherein the thermally insulating plastic foam has a thermal conductivity smaller than 0.040 W/m*K measured at 50° C. and according to the standard EN12667.

13. Method according to claim 1, wherein the thermally insulating plastic foam has a pressure strength of at least 100 kPa, determined according to the standard ISO 844.

14. Method according to claim 1, wherein the thermally insulating plastic foam is formed by an isocyanate/polyol-mixture chemically reacting at room temperature.

* * * * *